US006728690B1

(12) United States Patent
Meek et al.

(10) Patent No.: US 6,728,690 B1
(45) Date of Patent: Apr. 27, 2004

(54) CLASSIFICATION SYSTEM TRAINER EMPLOYING MAXIMUM MARGIN BACK-PROPAGATION WITH PROBABILISTIC OUTPUTS

(75) Inventors: Christopher A. Meek, Kirkland, WA (US); John C. Platt, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/448,408

(22) Filed: Nov. 23, 1999

(51) Int. Cl.[7] .................................................. G06N 3/02
(52) U.S. Cl. ........................................... 706/25; 706/12
(58) Field of Search ......................... 706/25, 12; 707/6; 709/206

(56) References Cited

U.S. PATENT DOCUMENTS

| | | | |
|---|---|---|---|
| 5,649,068 A | * | 7/1997 | Boser et al. .................. 706/12 |
| 6,161,130 A | * | 12/2000 | Horvitz et al. ............... 709/206 |
| 6,192,360 B1 | * | 2/2001 | Dumais et al. ................ 707/6 |
| 6,327,581 B1 | * | 12/2001 | Platt ............................. 706/12 |

OTHER PUBLICATIONS

Bishop, C.M., *Neural Networks for Pattern Recognition*, Oxford University Press, ISBN 0198538642, 1–456, (1995).
Denker, J.S., et al. "Transforming Neural–Net Output Levels to Probability Distributions", *Advances in Neural Information Processing System 3*, 853–859.
Sontag, E.D., et al., "Back Propagation Separates Where Perceptrons Do", *Rutgers Center for Systems and Control*, Neural Networks, vol. 4, No. 2—ISSN 0893–6080, 243–249, (1991).
David D. Lewis and Jason Catlett, "Heterogeneous Uncertainty Sampling for Supervised Learning", *Machine Learning: Proceedings of the Eleventh International Conference*, Morgan Kaufmann Publishers, San Francisco, CA, pp. 148–156, 1994.

* cited by examiner

*Primary Examiner*—Wilbert L. Starks, Jr.
(74) *Attorney, Agent, or Firm*—Lyon & Harr, LLP; Mark A. Watson

(57) ABSTRACT

A training system for a classifier utilizes both a back-propagation system to iteratively modify parameters of functions which provide raw output indications of desired categories, wherein the parameters are modified based on a weighted decay, and a probability determining system with further parameters that are determined during iterative training. A margin error metric may be combined with weight decay, and a sigmoid is used to calibrate the raw outputs to probability percentages for each category. A method of training such a system involves gathering a training set of inputs and desired corresponding outputs. Classifier parameters are then initialized and an error margin is calculated with respect to the classifier parameters. A weight decay is then used to adjust the parameters. After a selected number of times through the training set, the parameters are deemed in final form, and an optimization routine is used to derive a set of probability transducer parameters for use in calculating the probable classification for each input.

27 Claims, 8 Drawing Sheets

US 6,728,690 B1

CLASSIFICATION SYSTEM TRAINER EMPLOYING MAXIMUM MARGIN BACK-PROPAGATION WITH PROBABILISTIC OUTPUTS

FIELD OF THE INVENTION

This invention relates generally to the field of classifiers and in particular to a trainer for classifiers employing maximum margin back-propagation with probability outputs.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright©1999, Microsoft Corporation, All Rights Reserved.

BACKGROUND

The problem of determining how to classify things is well known. Humans have an innate ability to classify things quickly. Many intelligence tests are based on this ability. For a human, it is quite simple to determine whether a coin is a penny, a nickel or other denomination. We can tell whether or not an email is junk mail or spam, which we don't want to read, or if it is an email from a friend or customer, that we need to read quickly. However, many humans do not have a comprehensive knowledge of how to determine whether the word "affect" or "effect" should be used when writing a sentence. There have been many attempts to program computers to classify things. The math involved can get quite complex. It was difficult early on to get a computer to classify coins, but neural networks, which were trained with many sets of input could do a pretty good job. The training for such simple classifiers was fairly straight forward due to the simplicity of the classifications.

However, classifying things as junk email or spam is much more difficult, and involves the use of complex mathematical functions. The rest of this background section describes some prior attempts at training classifiers. They involved the selection and modification of parameters for functions that compute indications of whether or not a particular input is likely in each of multiple categories. They involve the use of training sets, which are fed into classifiers, whose raw output is processed to modify the parameters. After several times through the training set, the parameters converge on what is thought to be a good set of parameters that when used in the classifier on input not in the training set, produces good raw output representative of the proper categories.

This raw output however, might not be directly related to the percentage likelihood that a particular category is the right one. This has lead to the use of a further function, called a probability transducer, that takes the raw output, and produces a probability for each category for the given input. There are many problems that remain with such systems. It is difficult to produce one that provides good performance, and does not over fit to the training data. Over fitting to the training data can produce wrong results, unless a very large amount of training data is provided. This, however, severely impacts performance.

A standard back-propagation architecture is shown in prior art FIG. 1. Functions used in this description are indicated by numbers in parentheses for ease of reference. Back-propagation is well-known in the art. It is described fully in section 4.8 in the book "Neural Networks for Pattern Recognition" by Christopher M. Bishop, published by Oxford Press in 1995. The purpose of a back-propagation architecture is to train a classifier 105 (and associated probability transducer 125) to produce probabilities of category membership given an input. The classifier 105 is trained by example. A training set comprising training inputs 100 is provided to the classifier 105. The classifier 105 has parameters 110 which are like adjustable coefficients for functions used to calculate raw outputs 120 indicative of class membership. The parameters 110 are adjusted so that the final probability outputs 135 are close to a set of desired outputs 145 for the training set. Given enough training inputs 100 and associated desired outputs 145, and a sensible choice of classifier 105, the overall system will generalize correctly to inputs that are not identical to those found in training inputs 100. In other words, it will produce a high probability that the input belongs in the correct category.

The functional form of classifier 105 can take many forms. The output 120 of the classifier 105 can be a single value, if the classifier is designed to make a single category probability. Alternatively, the output 120 of the classifier 105 can be a plurality of values, if the classifier is designed to produce probabilities for multiple categories. For purposes of discussion, the output 120 of a classifier 105 is denoted by a vector $y_i$, regardless of whether output 120 is a single output or a plurality of outputs. Similarly, one example of training input is denoted by a vector $x_j$, regardless of the true dimensionality of the training input.

Back-propagation is applicable to any classifier 105 that has a differentiable transfer function that is parameterized by one or more parameters 110. One typical functional form of classifier 105 is linear:

$$y_i = \sum_j w_{ij} x_j - b_i \qquad (1)$$

where $w_{ij}$ and $b_i$ are the parameters 110, j is the number of classes, and there are no internal state variables 115. Another typical functional form of classifier 105 is a linear superposition of basis functions:

$$y_i = \sum_k w_{ik} \varphi_k\left(\vec{x}, \vec{\theta}_k\right) - b_i \qquad (2)$$

where the $W_{ik}$, $b_i$, and $\theta_k$ are the parameters 110, and the $\Phi_k$ are the internal state of parameters 115. The parameterized functions $\Phi_k$ can take on many different forms, such as Gaussians or logistic functions, or multi-layer perceptrons, as is well-known in the art (see chapters 4 and 5 of the Bishop book). Other possible forms (e.g., convolutional neural networks) are known in the art.

The desired output 120 of a classifier 105 is a probability of a category 135. These probability outputs are denoted as $p_i$, again regardless of whether there is one probability value or a plurality of probability values. Typically, a probability transducer 125 is applied to the output 120 of the classifier 105 to convert it into a probability. When there is only one output or when the outputs are not mutually exclusive categories, a sigmoidal (or logit) function is typically used:

$$p_i = \frac{1}{1 + e^{A_i y_i + B_i}} \quad (3)$$

where $A_i$ is typically fixed to $-1$, while $B_i$ is typically fixed to 0. The parameters $A_i$ and $B_i$ are the fixed parameters 130. When a logit probability transducer is coupled to a linear classifier, the overall system performs a classical logistic regression. When the classifier 105 is deciding between a plurality of mutually exclusive categories, a softmax or winner-take-all function is often used:

$$p_i = \frac{e^{A_i y_i + B_i}}{\sum_j e^{A_j y_j + B_j}} \quad (4)$$

where $A_i$ is typically fixed to $+1$ and $B_i$ is typically fixed to 0. Again, the parameters $A_i$ and $B_i$ are the fixed parameters 130.

The back-propagation architecture will attempt to adjust the parameters of the classifier 110 to cause the probability outputs 135 to be close to the desired outputs 145. The values of the desired outputs 145 are denoted as $t_i$. The values of the desired outputs 145 are typically (although not always) either 0 or 1, depending on whether a specific training input 100 belongs to the category or not.

The closeness of the probability output 135 to the desired output 145 is measured by an error metric 140. The error metric computes an error function for one particular training input, whose corresponding parameters and values are denoted with a superscript (n). The error metric computes a function $E^{(n)}(p_i^{(n)}, t_i^{(n)})$ which is at a minimum when $p_i^{(n)}$ matches $t_i^{(n)}$. The output of the error metric is actually an error gradient 150:

$$g_i^{(n)} = \frac{\partial E^{(n)}}{\partial p_i^{(n)}} \quad (5)$$

The are many error metrics used in the prior art. For example, the squared error can be used:

$$E^{(n)} = \frac{1}{2} \sum_i (p_i^{(n)} - t_i^{(n)})^2 \quad (6)$$

or the cross-entropy score for use with probability transducer (3):

$$E^{(n)} = -\sum_i t_i^{(n)} \log(p_i^{(n)}) + (1 - t_i^{(n)}) \log(1 - p_i^{(n)}) \quad (7)$$

or the entropy score for use with probability transducer (4):

$$E^{(n)} = -\sum_i t_i^{(n)} \log(p_i^{(n)}) \quad (8)$$

The use of error metric (7) combined with probability transducer (3) or error metric (8) combined with probability transducer (4) is that the output of the probability transducer is trained to be a true posterior probability estimate of category given input data.

Previously, researchers such as Sontag and Sussman in "Back propagation separates where Perceptrons do" in the journal Neural Networks, volume 4, pages 243–249, (1991), have suggested using a margin error metric as error metric 140. The gradient (5) of a margin error metric is shown in FIG. 2. A margin error metric is defined as, for positive examples in the category, having a negative gradient below an output level $M_+$ and an exactly zero gradient above $M_+$, while for negative examples out of the category, having a positive gradient above an output level $M_-$ and an exactly zero gradient below $M_-$. The threshold $M_+$ must be strictly greater than the threshold $M_-$. A margin error metric was originally proposed by Sontag and Sussmann to ensure that data sets that are linearly separable would be cleanly separated by a back-propagation algorithm. The disadvantage of such a margin error metric is that the outputs are no longer probabilities.

The gradient computation 155 computes the partial derivative of the error E with respect to all of the parameters of the classifier by using the chain rule. The gradient computation 155 uses the gradient of the error 150, the probability outputs 135, the parameters 110, and any internal state 115 of the classifier 105. The computation of the gradient with back-propagation is well-known in the art: see section 4.8 of Bishop's book. The output of the gradient computation is denoted as $G_i^{(n)}$, where i is the index of the ith free parameter 110 of the classifier 105 and n is the index into the training set.

Once the $G_i^{(n)}$ are computed, the parameters 110 should be updated to reduce the error. The update rule 160 will update the parameters 110. There are any number of updating rules that cause the error to be reduced. One style of update rule 160 updates the parameters 110 every time a training input 100 is presented to classifier 105. Such update rules are called "on-line." Another style of update rule computes the true gradient of the error over the entire training set with respect to free parameters 110, by summing the $G_i^{(n)}$ over the index n of all training inputs 100, then updating the parameters after the sum is computed. Such update rules are called "batch".

One example of an update rule is the stochastic gradient descent rule, where the parameters 110 are adjusted by a small step in the direction that will improve the overall error. We will denote the ith parameter 110 of classifier 105 as $\gamma_i$:

$$\gamma_i \leftarrow \gamma_i - \eta G_i^{(n)} \quad (9)$$

The step size $\eta$ can be held constant, or decrease with time, as is well-known in the art. The convergence of stochastic gradient descent can be improved via momentum, as is well-known in the art:

$$\beta_i \leftarrow \alpha \beta_i + (1 - \alpha) \eta G_i^{(n)} \quad (10)$$

$$\gamma_i \leftarrow \gamma_i \leftarrow \beta_i$$

Either stochastic gradient descent or stochastic gradient descent with momentum can be used in either on-line or batch mode. In batch mode, the term $G_i^{(n)}$ is replaced with a sum of $G_i^{(n)}$ over all n. Other numerical algorithms can be used in batch mode, such as conjugate gradient, pseudo-Newton, or Levenberg-Marquardt. Chapter 7 of Bishop's book describes many possible numerical algorithms to minimize the error.

Simply minimizing the error on the training set can often lead to paradoxically poor results. The classifier 105 will work very well on inputs that are in the training set, but will work poorly with inputs that are away from the training set. This is known as overfitting: by minimizing only the error on the training set, the error off the training set is only indirectly minimized, and could be high.

There are many algorithms to avoid overfitting. One very simple algorithm is to penalize parameters 110 that have large value (see Bishop, section 9.2). This algorithm is known as weight decay. Weight decay 165 is shown in FIG. 1: it uses the current values of the parameters to modify the update rule.

The reasoning behind weight decay is that the correct classifier should be the most likely classifier given the data. According to Bayes' rule, the posterior probability of classifier given data is proportional to the probability of the data given the classifier (the likelihood) multiplied by the prior probability of the classifier. The error on the training set is commonly interpreted as a log likelihood: to account for the prior, a log prior must be added to the error. If the prior probability over parameters 110 is a Gaussian with mean zero, then the log prior is a quadratic penalty on the parameters 110. The derivative of a quadratic is linear, so a Gaussian prior over the parameters 110 adds a linear term to the update rule. With weight decay, the update rule (9) becomes:

$$\gamma_i \leftarrow (1-\epsilon)\gamma_i - \eta G_i \quad (11)$$

while update rule (10) becomes:

$$\beta_i \leftarrow \alpha\beta_i + (1-\alpha)(\eta G_i + \varepsilon\gamma_i) \quad (12)$$
$$\gamma_i \leftarrow y_i - \beta_i$$

People of ordinary skill in the art will understand how to modify an update rule (such as conjugate gradient) to reflect a weight decay term.

The architecture in FIG. 1 is limited, because the generalization error for data not in the training set is not directly minimized. Section 10.1 of the book "Statistical Learning Theory" by Vladimir Vapnik (published by Wiley Interscience in 1998) proposes using a support vector machine: a linear classifier (1) with only one output value trained via the following quadratic programming problem:

$$\min \sum_j w_j^2 + C \sum_n \xi^{(n)} \quad (13)$$

$$\text{subject to } y^{(n)} T^{(n)} \geq 1 - \xi^{(n)}, \xi^{(n)} \geq 0$$

where $w_j$ is the weight of the input $X_j$ contributing to the single output, $\gamma^{(n)}$ is the output value of the classifier when the input is the nth training example; while $T^{(n)}$ is the desired output of the classifier for the nth training example, $T^{(n)}$ is +1 for positive examples in the category and −1 for negative examples out of the category. Vapnik proposes this quadratic programming problem in order to directly minimize a bound on the error of the classifier on inputs not in the training set. When the quadratic optimization problem (13) is solved, then the weights $w_i$ and the threshold b are the optimal hyperplane that splits inputs in the category from inputs out of the category.

The architecture to solve the constrained optimization problem (13) is shown in prior art FIG. 3, where the training inputs 100 are fed to a classifier 105 to produce raw outputs 120. The input 100 and outputs 120 and desired outputs 145 are all provided to a quadratic programming solver 200, which updates the parameters 110.

Section 10.5 of Vapnik's book also describes extension of the quadratic programming problem (13) to non-linear support vector machines. Those extensions are limited to those non-linear classifiers of form (2) whose basis functions Φ obey a set of conditions, called Mercer's conditions. Such a non-linear extension has the same architecture as the linear case, as shown in FIG. 3: the matrix used in the quadratic programming 200 is different than the linear case.

Sections 7.12 and 11.11 of Vapnik's book describe a method for mapping the output of a classifier trained via constrained optimization problem (13) into probabilities, using an architecture also shown in FIG. 3. After the parameters 100 of the classifier 105 are completely determined, the raw outputs 120 of the final classifier are fed to a probability transducer 125. The probability transducer suggested by Vapnik is a linear blend of cosines. The blending coefficients are the parameters of the probability transducer 210. These parameters are determined from statistical measurements of the raw outputs 120 and the desired outputs 145 involving Parzen window kernels (see Vapnik, sections 7.11 and 7.12).

Vapnik's support vector machine learning architecture produces classifiers that perform very well on inputs not in the training set. However, only a limited array of non-linear classifiers can be trained. Also, the number of non-linear basis functions Φ used in a support vector machine tends to be much larger than the number of basis functions used in a back-propagation network, so that support vector machines are often slower at run time. Also, the probability transducer proposed by Vapnik may not yield a probability function that is monotonic with raw output, which is a desirable feature. Nor are the probabilities constrained to lie between 0 and 1, nor sum to 1 across all classes.

Prior art FIG. 4 shows another example of prior art disclosed by Denker and LeCun in the paper "Transforming Neural-Net Output Levels to Probability Distributions", which appears in the Advances in Neural Information Processing Systems conference proceedings, volume 3, pages 853–859. Here, a classifier 105 is trained using the standard architecture shown in FIG. 1. Then, a new probability transducer is trained from a calibration set of input data, separate from the training set. Denker and LeCun then suggest that the probability transducer 125 has its parameters 210 determined by statistical measurements 225. In this case, the statistical measurements need to know the gradient and the Hessian of the error metric 140 with respect to the parameters 110. These measurements then determine the parameters of the new probability transducer, which is either a Parzen window non-parametric estimator or a softmax function (4) with parameters $A_i$ and $B_i$ determined from the statistical measurements 225.

The limitation of the Denker and LeCun method using Parzen windows is that Parzen windows take a lot of memory and may be slow at run-time and may not yield a probability output that is monotonic in the raw output. The problem with the softmax estimator with parameters derived from the statistical measurements 225 is that the assumptions that derive these parameters (that the outputs for every category are spherical Gaussians with equal variance) may not be true, hence the parameters may not be optimal.

There is a need for a learning architecture that is as applicable as back-propagation to many classifier functional forms, while still providing the mathematical assurance of support vector machines of good performance on inputs not in the training set. There is a further need for a system that yields true posterior probabilities that are monotonic in the raw output of the classifier and that does not require a non-parametric probability transducer. There is a need for a training system that minimizes a bound on expected testing error, which means that it avoids overfitting.

SUMMARY OF THE INVENTION

A training system for a classifier utilizes both a back-propagation system to iteratively modify parameters of functions which provide raw output indications of desired categories, wherein the parameters are modified based on weight decay, and a probability determining system with further parameters that are determined during iterative training. The raw output of the back-propagation system provide-either a high or low indication for each category for a given input, while the parameters for the probability determining system, combined with the raw outputs, are used to determine the percentage likelihood of each classification for a given input.

In one aspect of the invention, the back-propagation system uses a margin error metric combined with weight decay. The probability determining system uses a sigmoid to calibrate the raw outputs to probability percentages for each category.

The training system may be used with multiple applications in order to determine the probability that some item fits in one of potentially several categories, or just one category. One practical application involves identifying email as spam or junk email versus email people want to receive, or in grammar checking programs such as determining whether the word "affect" or "effect" is correct based on the preceding 100 words.

A method of training such a system involves gathering a training set of inputs and desired corresponding outputs. Classifier parameters are then initialized and an error margin is calculated with respect to the classifier parameters. A weight decay is then used to adjust the parameters. After a selected number of times through the training set, the parameters are deemed in final form, and an optimization routine is used to derive a set of probability transducer parameters for use in calculating the probable classification for each input.

The training system minimizes a bound on expected testing error, which means that it avoids overfitting so that training points which are outside normal ranges do not adversely affect the parameters. It provides a compact function with a minimal number of parameters for a given accuracy. In addition, the system provides simultaneous training of all the parameters for all the classes as opposed to prior systems which required individual training of parameters. The result is a simple and fast to evaluate probabalistic output that is monotonic.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. In the first section, a hardware and operating environment in conjunction with which embodiments of the invention may be practiced are described. In the second section, the architecture of the classification training system is described along with alternative descriptions. A third section describes a method of using the training system, followed by a conclusion which describes some potential benefits and describes further alternative embodiments.

Hardware and Operating Environment

Figure 5:
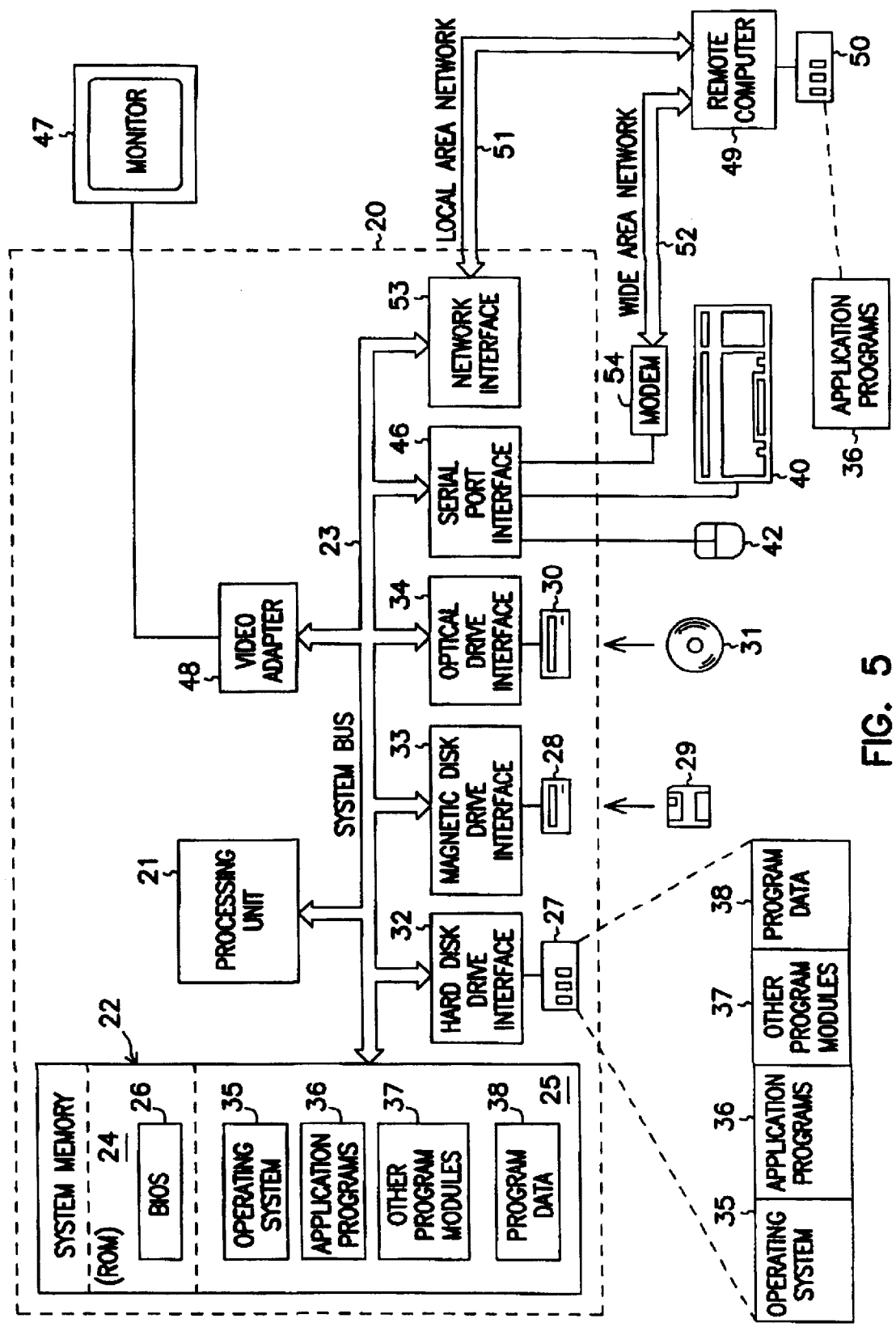
FIG. 5 is a block diagram of a computer system implementing the present invention.

FIG. 5 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 5 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 5, such as a parallel port, a game port, or a universal serial bus (USB). A monitor 47 or other display device also connects to system bus 23 via an interface such as a video adapter 48. A video camera or other video source may be coupled to video adapter 48 for providing video images for video conferencing and other applications, which may be processed and further transmitted by personal computer 20. In further embodiments, a separate video card may be provided for accepting signals from multiple devices, including satellite broadcast encoded images. In addition to the monitor, personal computers typically include other peripheral output devices (not shown) such as speakers and printers.

Figure 1:
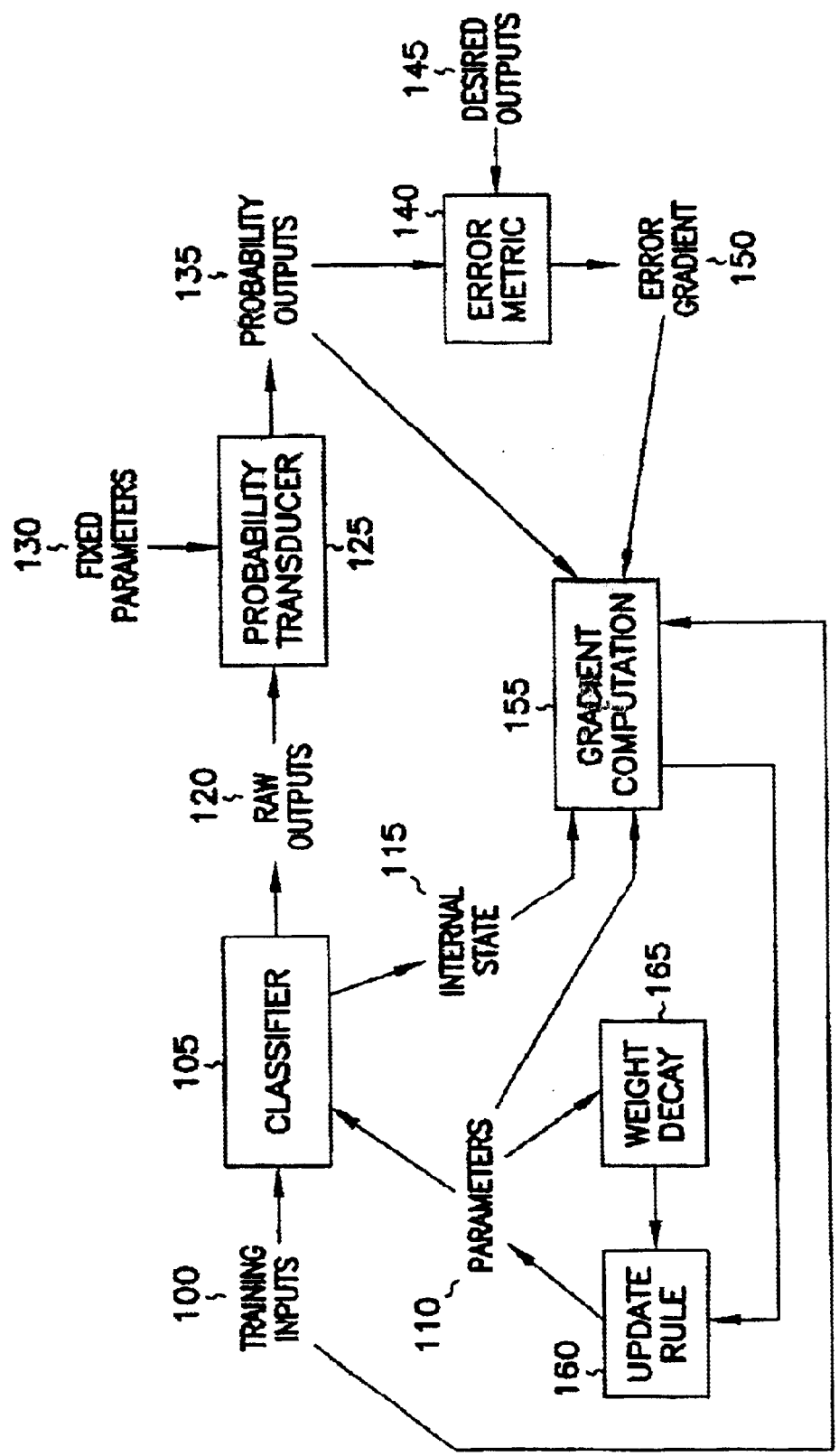
FIG. 1 is a prior art block diagram of a standard back-propagation architecture.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via a serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Figure 6:
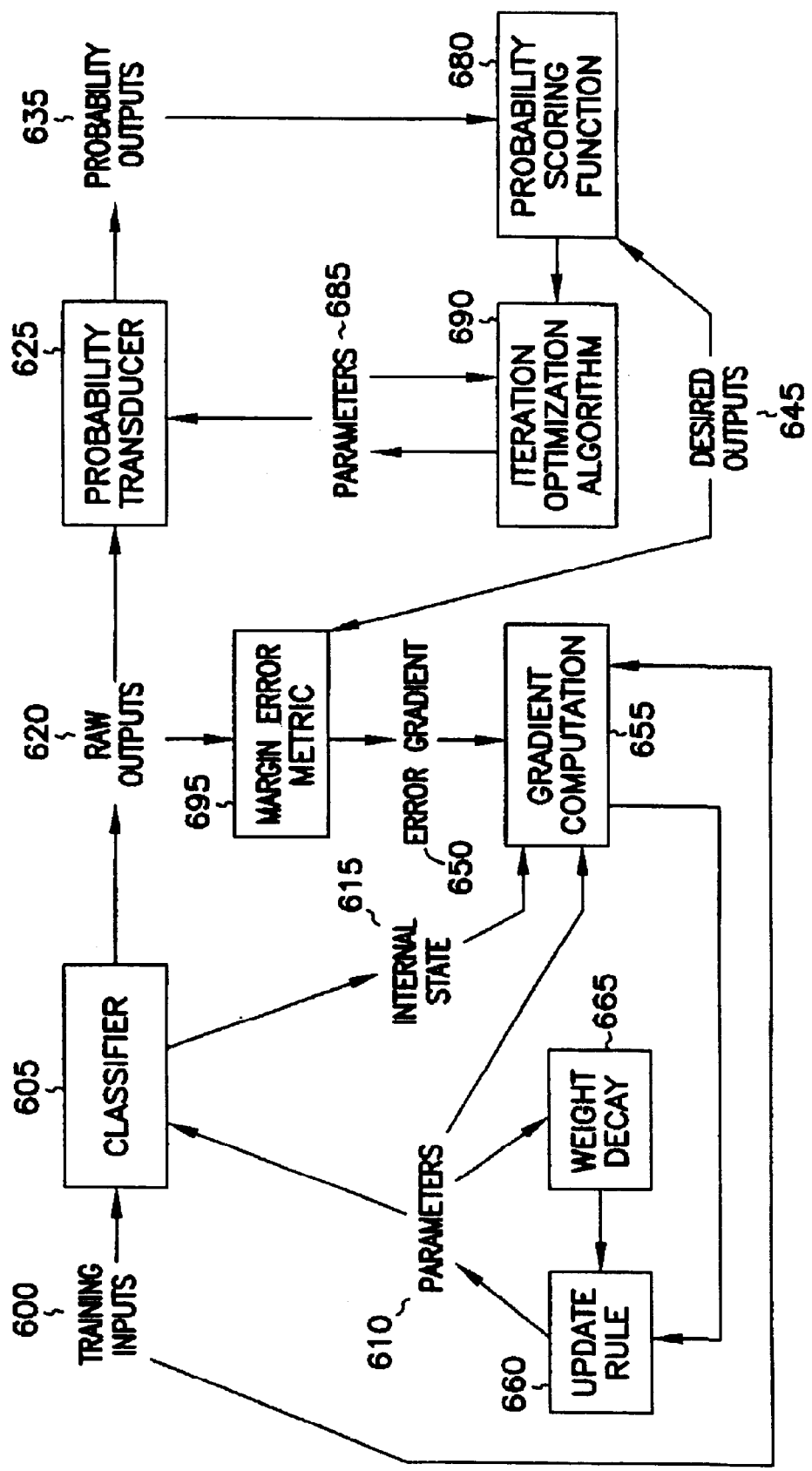
FIG. 6 is a block diagram of a training system in accordance with the present invention.

In FIG. 6, a block diagram of a training system uses the mathematics of support vector machines in equation (13) applied to back-propagation. The quadratic programming problem (13) is equivalent to the non-differentiable error function for one output:

$$\min \frac{1}{C} \sum_j w_j^2 + \sum_n (1 - y^{(n)} T^{(n)})_+ \quad (14)$$

where the $(\ldots)_+$ function denotes a function which returns its argument if positive, and zero otherwise and $f^{(n)}$ is either +1 or −1. If the classifier function is of the form of equation (1), then the first term in (14) can be identified as a weight decay term with strength 1/C. If the classifier function is of the form of equation (2), then the first term in (14) can be identified as a weight decay with strength 1/C only for the $w_i$ parameters: the weights of the last layer. The derivative of the second term is exactly the margin error function shown in FIG. 2, with $M_+=1$ and $M_-=-1$ and the magnitude of the non-zero part of the gradient=1. Those of ordinary skill in the art have avoided the minimization problem (14) due to its non-differentiability. However, this invention teaches that stochastic gradient descent (9) or (10) still works with non-differentiable functions and hence has advantages for solving classification problems.

The error function (14) can be generalized to more than one output:

$$\min \frac{1}{C} \sum_{i,j} w_{ij}^2 + \sum_{i,n} (1 - y_i^{(n)} T_i^{(n)})_+ \quad (15)$$

This generalized error function is very useful: via back-propagation, it causes the last layer to become an optimal hyperplane, while forcing the basis functions Φ to form a mapping that separates the data maximally. Hence, the basis functions are adapted to the problem, unlike standard support vector machines, where the basis functions are fixed ahead of time to be centered on the training examples.

The architecture of the invention is shown in FIG. 6. Training inputs 600 are provided to a classifier 605 with a differentiable transfer function. In one embodiment, the classifier 605 computes equation (2), with non-linear basis functions:

$$\varphi_k^{(n)} = \tanh\left(\sum_j \theta_{kj} x_j^{(n)} - q_k\right) \quad (16)$$

Figure 2:
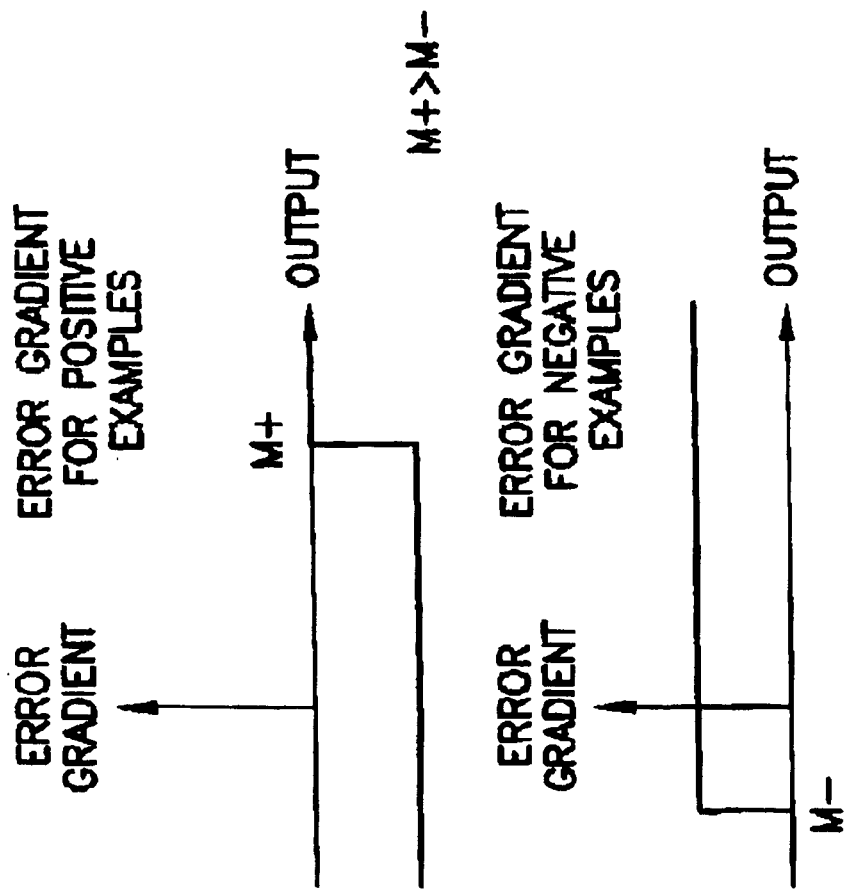
FIG. 2 is a prior art graph of a gradient of a margin error metric.
Figure 3:
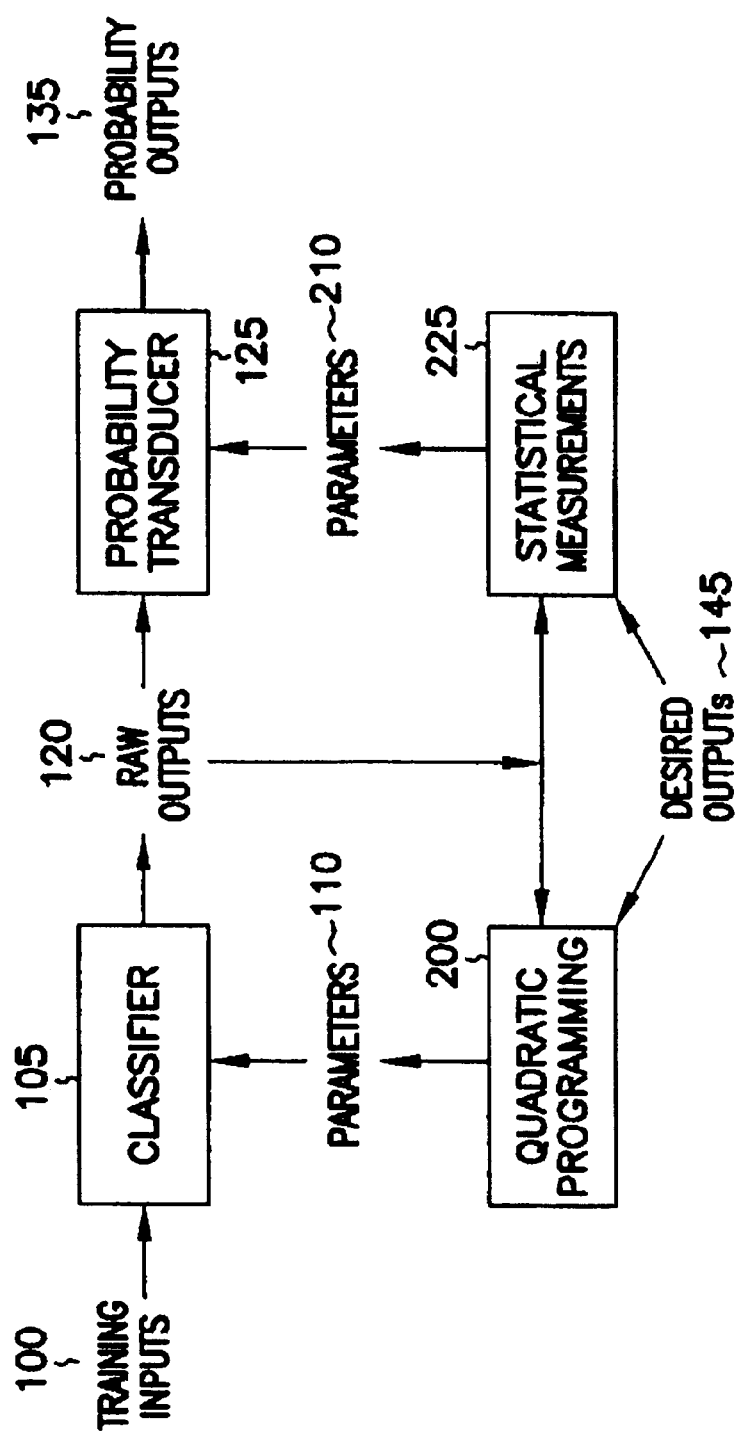
FIG. 3 is a prior art block diagram of a classification system using a quadratic programming solver to update parameters.
Figure 4:
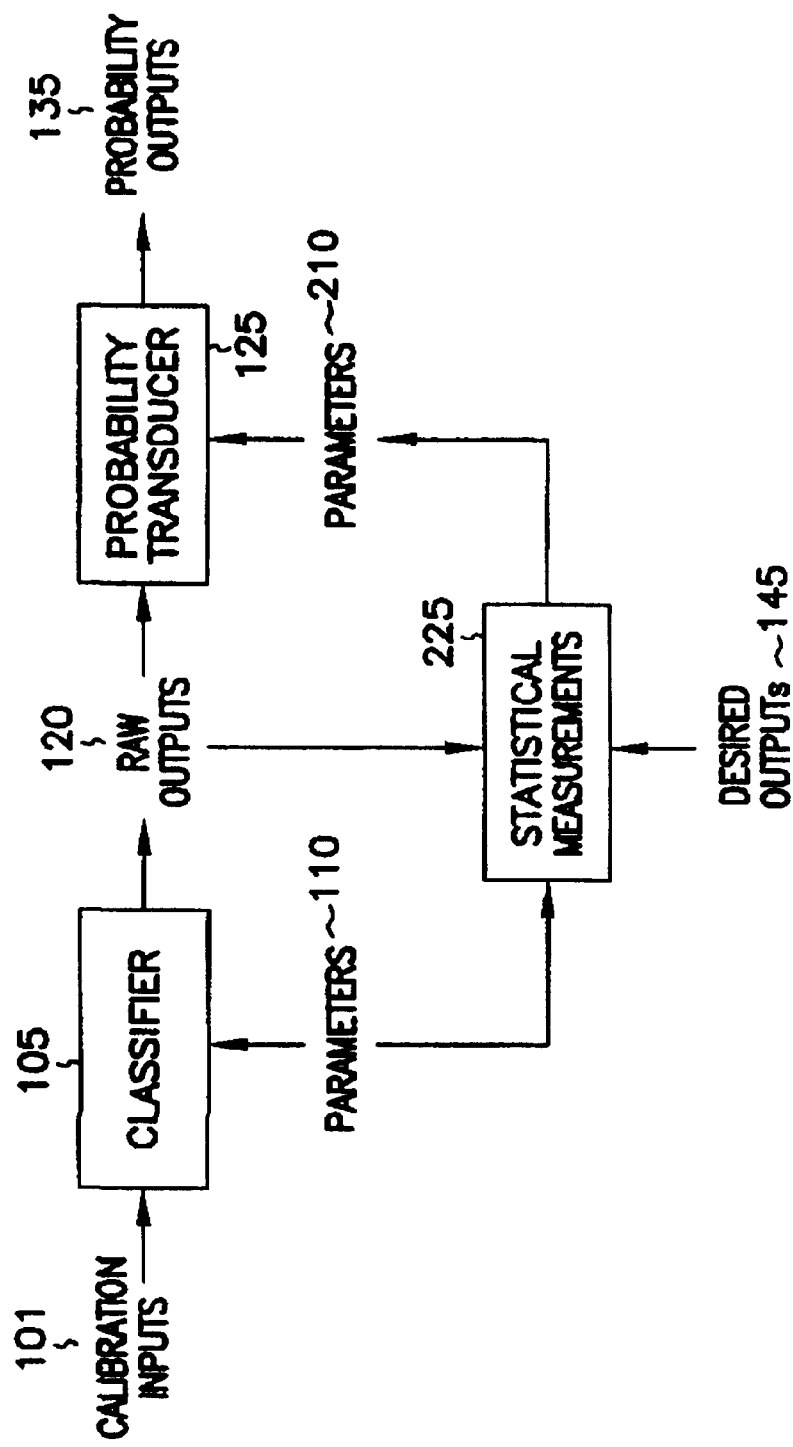
FIG. 4 is a prior art block diagram of a classification system similar to that shown in FIG. 1 with the addition of a probability transducer calibrated separate from a training set.

The raw outputs 620 of the classifier are then fed to a margin error metric 695. Generally, the margin error metric 695 can compute any margin error metric. In the preferred embodiment, margin error metric 695 computes the error gradient 650:

$$h_i^{(n)} = -\eta H(1 - y_i^{(n)} t_i^{(n)}) t_i^{(n)} \quad (17)$$

which is shown in FIG. 2, where H is the Heaviside step function. Note that the error gradient 650 is pre-scaled by $\eta$ in order to save computation. This error gradient is then fed to a gradient computation 655, which produces a gradient which gets fed to an update rule 660 to update the parameters 610. In addition, in order to ensure that the last layer of classifier 605 computes an optimal hyperplane, weight decay 665 is required for at least the $w_{ik}$ parameters. Other weight decay terms can optionally be added.

In one embodiment, the gradient computation 655, the update rule 660, and the weight decay 665 are combined into the operations (18), (19), and (20), shown below. Stochastic gradient descent with momentum is used. The operation (18) updates the last layer weights and thresholds.

$$B_i \leftarrow (1 - \alpha) B_i - a h_i^{(n)} \quad (18)$$

$$b_i \leftarrow b_i - B_i$$

$$\beta_{ik} \leftarrow (1 - \alpha) \beta_{ik} + \alpha \left( h_i^{(n)} \varphi_k^{(n)} - \frac{\eta}{NC} w_{ik} \right)$$

$$w_{ik} \leftarrow w_{ik} - \beta_{ik}$$

where N is the number of training examples. One step of back-propagation is then applied to use the internal state 615 to help compute the gradients for the first layer:

$$\delta_k^{(n)} = (1 + \varphi_k^{(n)})(1 - \varphi_k^{(n)}) \sum_i h_i^{(n)} \quad (19)$$

The updates for the first layer are then computed:

$$Q_k \leftarrow (1 - \alpha) Q_k - a \delta_k^{(n)} \quad (20)$$

$$q_k \leftarrow q_k - Q_k$$

$$\zeta_{kj} \leftarrow (1 - \alpha) \zeta_{kj} + a \delta_k^{(n)} x_j^{(n)}$$

$$\theta_{kj} \leftarrow \theta_{kj} - \zeta_{kj}$$

Those of ordinary skill in the art can generalize (18), (19), and (20) to single-layer classifiers of form (1) (by using only operation (18) and substituting $x_j^{(n)}$ for $\Phi_j^{(n)}$) and multi-layer classifiers with alternative $\Phi$.

An alternative margin error function 695 can produce an error gradient 650 of the form:

$$h_i^{(n)} = -\eta_1 H(1 - y_i^{(n)}) H(t_i^{(n)}) + \eta_2 H(1 + y_i^{(n)}) H(-t_i^{(n)}) \quad (21)$$

The form (21) is used when making a type I error has a different cost than making a type II error. For example, in detecting junk e-mail, a classifier error that mistakes a real mail message for a junk message is more serious than mistaking a junk message for a real mail message. If a classifier 605 is being built to distinguish junk from real e-mail, and junk e-mail is defined to be the positive category, then $\eta_2$ should be substantially larger than $\eta_1$.

The use of a margin error function 695 and a weight decay function 665 provides excellent generalization performance, however the raw outputs 620 are not interpretable as probabilities. For some applications, this is acceptable, although can provide sub-optimal decision boundaries. In one embodiment, a probability transducer 625 is added to the system to produce probability outputs 635. In one embodiment, probability transducer 625 has form (3) when there is only one output or the outputs are not mutually exclusive and form (4) when the outputs are mutually exclusive.

The parameters 685 of the probability transducer 625 can be determined from the training set. This is preferable to a calibration set, since it requires less data, although a separate calibration set can be used. Instead of making assumptions about the probability densities of the raw output given the category label, the parameters 685 are found that estimate posterior probabilities directly. In other words, the probability transducer 625 is trained like a small neural network (with only two parameters per category in one embodiment). The system uses a probability scoring function 680 that compares the desired outputs 645 to the probability outputs 635. The mismatch between the probability outputs 635 and the desired outputs 645 is fed to an iterative optimization algorithm 690, which produces a set of parameters 685 which minimizes the mismatch between the probability outputs 635 and the desired outputs 645. A sophisticated optimization algorithm can be used, due to the small number of parameters that need to be optimized. If probability transducer 625 has form (3), then finding the parameters for each category is a separable problem and the optimization algorithm 690 can be called once for every category.

The type of probability scoring function 680 depends on the form of the probability transducer 625. If the probability transducer 625 has form (3), then the scoring function 680 would likely have the form:

$$E^{(n)} = -\sum_i r_i^{(n)} \log(p_i^{(n)}) + (1 - r_i^{(n)}) \log(1 - p_i^{(n)}) \quad (22)$$

where the $r_i^{(n)}$ are derived below. If the probability transducer 125 has form (4), then the scoring function 680 would have form:

$$E^{(n)} = -\sum_i r_i^{(n)} \log(p_i^{(n)}) \quad (23)$$

Equations (22) and (23) are very similar to equations (7) and (8). Indeed, one possible method is to set $r_i^{(n)} = e_i^{(n)}$. The problem with this equality is that it could lead to overfitting of the probability transducer 625. One example of overfitting is when all of the negative examples have negative raw outputs while all of the positive examples have positive raw outputs. In this case, the error function (22) is minimized when probability transducer equation (3) has $A_i = -\infty$ and $B_i = 0$, which yields probabilities that are either 0 or 1.

In order to not overfit the probability transducer, a Bayesian prior must be placed on the iterative optimization 690. In one embodiment, it is assumed that every data point has a non-zero probability of having the opposite label. The probability of this label flip will go to zero as the number of data points of a given label goes to infinity. In other words, the value $r_i^{(n)}$ is the posterior probability of the data point being in the class, given a uniform prior over probability of being in the class. If $t_i^{(n)}=1$ (a positive example in the category), then $$r_i^{(n)} = \frac{N_+ + 1}{N_+ + 2} \quad (24)$$

where $N_+$ is the number of positive examples in the training set. If $i_i^{(n)}=0$ (a negative example not in the category), then $$r_i^{(n)} = \frac{N_- + 1}{N_- + 2} \quad (25)$$

where $N_-$ is the number of negative examples in the training set. Other methods known in the art of regularizing the fit can be used.

Probability scoring functions (22) or (23) provide a maximum likelihood parameter estimate given that the training labels were drawn independently from a multinomial distribution with probability given by the output of the probability $$E^{(n)} = \sum_i \frac{1}{2}(r_i^{(n)} - p_i^{(n)})^2 - kr_i^{(n)}\log(p_i^{(n)}) - k(1 - r_i^{(n)})\log(1 - p_i^{(n)}) \quad (26)$$

transducer 125. In practice, these functions give good fit to probabilities near 0 and 1 and poorer fit to probabilities near 0.5. In an alternative implementation, when producing more accurate probabilities near 0.5 is important, the following scoring functions can be used:

$$E^{(n)} = \sum_i \frac{1}{2}(r_i^{(n)} - p_i^{(n)})^2 - kr_i^{(n)}\log(p_i^{(n)}) \quad (27)$$

where scoring function (26) is used with probability transducer form (3) and scoring function (27) is used with probability transducer form (4). The scoring functions (26) and (27) are known in the art, but have not been used in the context of the present invention. The value k is typically 0.05.

Iterative optimization algorithm 690 can be selected amongst any of a number of unconstrained optimization algorithms, including conjugate gradient, variable metric methods, or Newton methods. In one embodiment, optimization algorithm 690 is a second-derivative trust-region method, as is known in the art. See the book Practical Optimization written by Phillip Gill, Walter Murray, and Margaret Wright, page 113–115, published by Academic Press in 1981.

Figure 7:
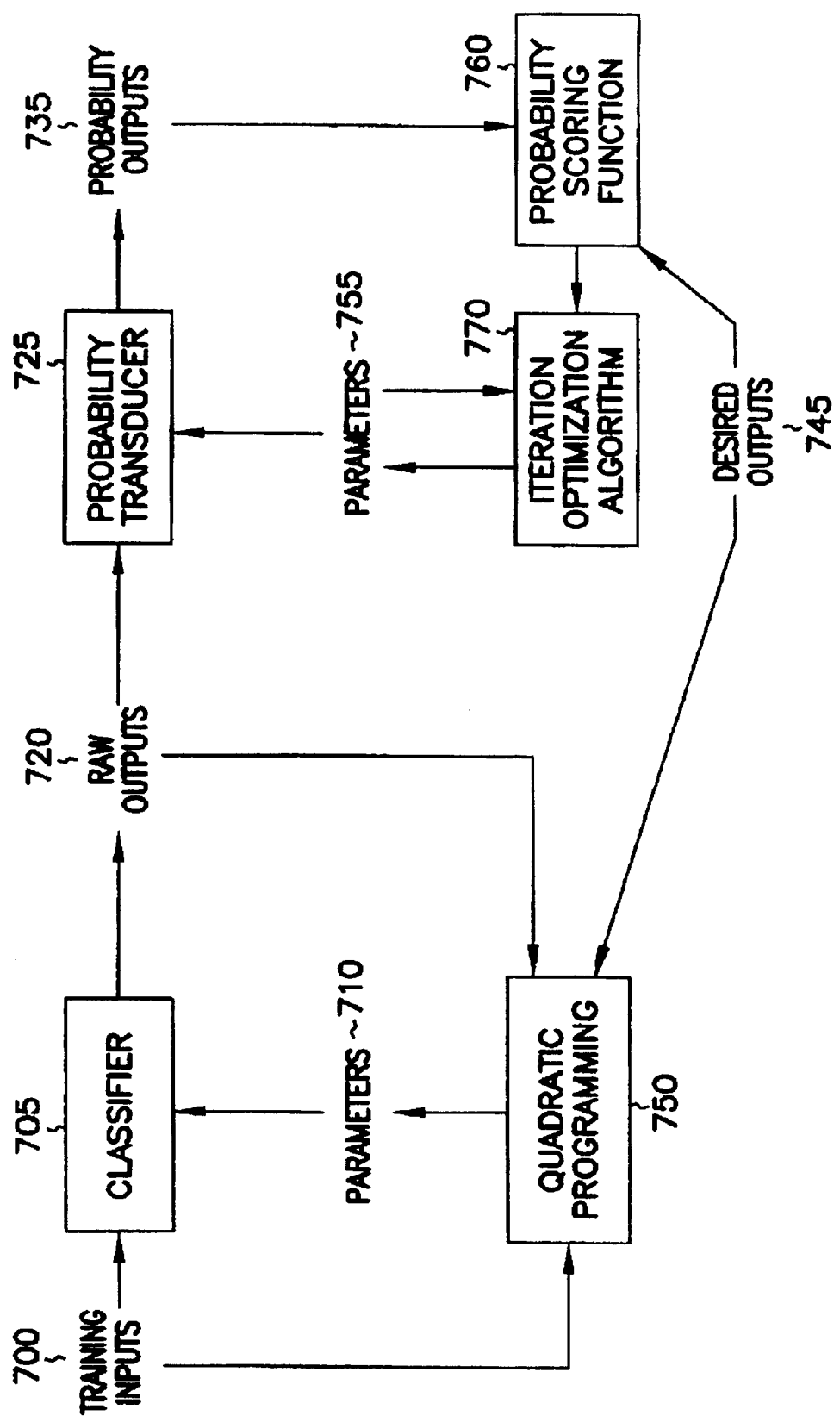
FIG. 7 is a block diagram of an alternative embodiment of the training system of the present invention.

An alternative embodiment is shown in FIG. 7, where a standard support vector machine architecture (training inputs 700, classifier 705, raw outputs 720, classifier parameters 710, and quadratic programming 750) is combined with the probability transducer learning architecture of FIG. 6 (probability transducer 725, probability outputs 735, probability scoring function 760, optimization algorithm 770, parameters 755). The alternative embodiment provides the standard support vector machine model with a monotonic probability transducer. The probability transducer 725 can implement equations (3) or (4). The probability scoring function 760 can implement equations (22), (23), (26), or (27).

Figure 8:
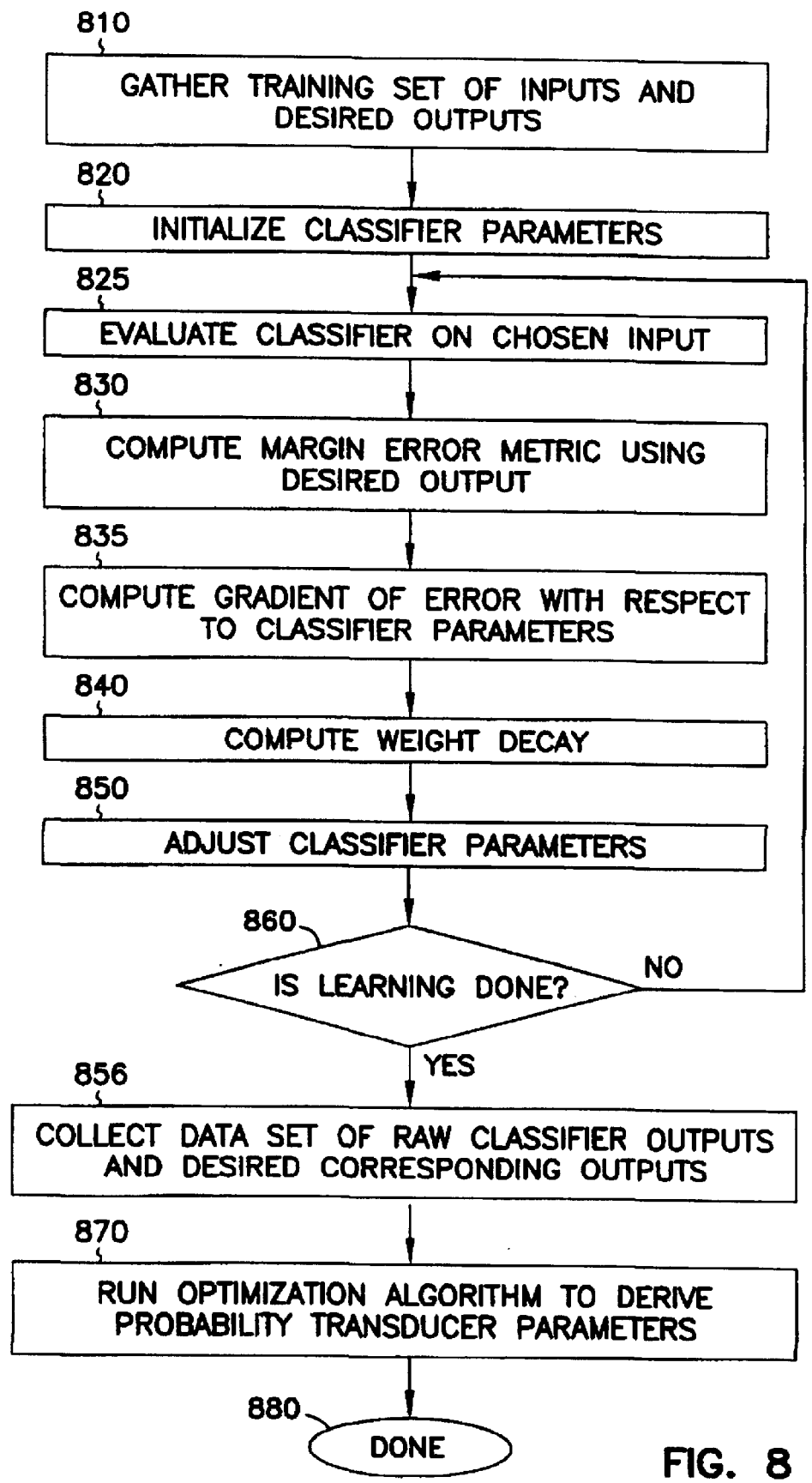
FIG. 8 is a flowchart illustrating a method of generating sets of parameters for the training system in accordance with the present invention.

FIG. 8 shows a flowchart for a computer program used to determine the parameters for the classifier of the present invention. The program is one which can be comprised of modules or other program elements, stored on the random access memory of the computer system of FIG. 5 and run or executed on the processor therein. It may also be communicated on a carrier wave or stored on some other form of computer readable medium for distribution to further computer systems.

At 810, a training set of inputs and desired outputs is gathered using methods well known in the art. A sufficient number of such inputs and desired outputs will depend on the complexity of the classification to be performed, and will be higher with a greater complexity. At 820, classifier parameters are initialized in one of many known manners. They may be randomly selected within certain ranges, or may actually have predetermined values as desired. At 825, a classifier using current parameters is run against a chosen input. At 830, a margin error metric is computed using the desired output, and at 835, a gradient of error with respect to the current parameters is computed, followed by a computation of weight decay for the parameters at 840. The parameters are then adjusted at 850, followed by a determination at 860 as to whether the learning is done. If not done, control returns to block 825, and the process is repeated to further modify the parameters. This determination can be based on a selected number of runs through the training set. Up to 800 or more runs should produce adequate stability of the parameters. Other numbers of runs may be significantly more or less depending on how clearly the data sets are separable into different categories. A further way of determining whether the learning is done comprises running a classifier with the parameters against an unused portion of the data set after each learning loop until a desired accuracy is obtained. Other methods apparent to those skilled in the art and may be used without departing from the invention.

Once the determination that learning is complete at 860 is made, a data set of raw classifier outputs and desired corresponding outputs is collected at 865 for use in running an optimization algorithm to derive the probability transducer parameters at 870. This ends the training session, and results in two sets of parameters, which when combined in respective classifier and probability transducer provide a probability for a given input for each category.

Conclusion

A training system provides parameters for a parameterized classifier which provides raw outputs. Parameters for a separately trained probability transducer are also provided. The probability transducer takes raw outputs from the classifier, which employs either support vector machines using quadratic programming or a margin error metric with weight decay to produce a classifier whose raw output is not directly correlated to percentage probability that an input should be classified in a given category. The probability transducer is separately trained on this output using either the same training set, or subset thereof, or a calibration set. The training of the probability transducer parameters is similar to classic neural net training, in that two parameters per category are trained based on minimizing the mismatch between the probabilities generated, and the desired output. The parameters are used in a selected sigmoid function to generate the probabilities.

The training system is utilized to provide classification systems for many different types of classifiers. Examples include use in determining whether an email is one which a user would not normally like to waste time on, referred to as junk email or spam, and also can be used in many other practical applications, including grammar checkers. Further, a set of parameters in and of itself has practical application in that is can be transmitted via machine readable medium, including carrier waves to a classification system as described above to enable the classification system to properly categorize input. The system yields true posterior probabilities that are monotonic in the raw output of the classifier and does not require a non-parametric probability transducer.

This application is intended to cover any adaptations or variations of the present invention. It is manifestly intended that this invention be limited only by the claims and equivalents thereof.

We claim:

1. A method of training a classifier on a training set having training input and desired output, the method comprising:
   using initial parameters to determine raw output based on the training input;
   computing a gradient of a margin error function based on the raw output and desired output defined by the training set;
   determining a weight decay factor for selected classifier parameters;
   adjusting the classifier parameters based on the error gradient and weight decay factor; and
   separately optimizing probability transducer parameters based on the raw output and desired output.

2. The method of claim 1 wherein adjusting the classifier parameters comprises a stochastic gradient descent with momentum step.

3. The method of claim 1 wherein the probability transducer parameters are optimized based on a probability scoring function and an iterative optimization algorithm.

4. The method of claim 3 wherein the probability transducer determines a probability for one or more categories, and parameters are optimized to minimize mismatch between such probabilities and the desired outputs.

5. A computer readable medium having computer executable instructions stored thereon for performing the method of claim 1.

6. A system for training a categorization system, comprising:
   a classifier that receives training input and desired output, and provides raw outputs;
   a margin error metric module that receives the raw outputs and computes an error gradient for updating parameters related to the raw outputs;
   a weight decay module that decays selected parameters;
   a probability transducer that iteratively derives probabilities based on the raw outputs and desired outputs; and
   an optimization module that modifies transducer parameters separately from the classifier.

7. A machine readable medium having instructions stored thereon for causing a computer to perform a method of training a classifier comprising:
   determining a margin error metric of classifier parameters using a desired output;
   determining a gradient of the margin error metric with respect to classifier parameters;
   determining a weight decay for selected classifier parameters;
   adjusting the classifier parameters based on the error gradient and weight decay; and
   optimizing probability transducer parameters based on a final set of adjusted training parameters.

8. The machine readable medium of claim 7 and further having instructions for causing the computer to adjust probability transducer parameters independent of adjusting the classifier parameters.

9. A system for training a classifier to identify a probable category for a given input, the system comprising:
   a classifier that receives training input and desired output, and provides raw output based on a plurality of parameters;
   an error module that receives the raw outputs and modifies parameters related to the raw outputs as a function of a margin error metric function of the raw output and the desired output; and
   a probability transducer that is trained based on the raw outputs and desired outputs to provide probabilities for each category.

10. The system of claim 9 and further comprising means for reducing overfitting.

11. The system of claim 10 wherein the means for reducing overfitting comprises a weight decay module that reduces heavily weighted parameters.

12. The system of claim 11 wherein the weight decay module reduces such parameters by a predetermined amount each time the training input is received.

13. The system of claim 9 wherein the error module comprises a margin error metric module that determines an error gradient for updating parameters related to the raw outputs.

14. A system for training a classifier to identify a probable category for a given input, the system comprising:
   a classifier that receives training input and desired output, and provides raw output based on a plurality of parameters, which are modified by the classifier based on a margin error metric function of the raw output and the desired output; and
   a probability transducer which incorporates a probability scoring function and iteratively modifies probability parameters based on training input.

15. The system of claim 14 wherein the classifier employs a quadratic programming module.

16. The system of claim 14 wherein the classifier comprises a support vector machine or a neural network trained via back-propagation.

17. The system of claim 16 wherein the probability transducer comprises an iterative optimization module and a probability scoring module.

18. The system of claim 17 wherein the probability transducer implements a function of the form:

$$p_i = \frac{1}{1 + e^{A_i y_i + B_i}} \text{ or} \quad (3)$$

$$p_i = \frac{e^{A_i y_i + B_i}}{\sum_j e^{A_j y_j + B_j}} \quad (4)$$

where A and B are parameters modified by the iterative optimization module.

19. The system of claim 18, and further comprising an error module that receives the raw outputs and provides an indication of modifications to be made to parameters as a function of a comparison of the raw output to the desired output.

20. The system of claim 19 wherein the error module implements stochastic gradient descent with momentum.

21. The system of claim 19 and further comprising an error decay module to avoid overfitting of the classifier raw output to the desired output.

22. The system of claim 17 wherein the scoring module implements a function of determining the probability, p, for each category i of:

$$E^{(n)} = -\sum_i r_i^{(n)}\log(p_i^{(n)}) + (1 - r_i^{(n)})\log(1 - p_i^{(n)}) \text{ or} \quad (22)$$

$$E^{(n)} = -\sum_i r_i^{(n)}\log(p_i^{(n)}) \quad (23)$$

where If $t_i^{(n)}=1$, then $$r_i^{(n)} = \frac{N_+ + 1}{N_+ + 2} \quad (24)$$

where $N_+$ is the number of positive examples in the training set; and if $t_i^{(n)}=0$, then $$r_i^{(n)} = \frac{N_- + 1}{N_- + 2} \quad (25)$$

where $N_-$ is the number of negative examples in the training set.

23. The system of claim 22 wherein the probability transducer implements equations (3) or (4) and the probability scoring module implements equations (22), (23), (26) or (27).

24. A system for categorizing input comprising:
a classifier that receives input and provides raw output based on a plurality of parameters which have been modified based on a comparison of raw output generated in response to a training set having inputs and corresponding desired output; and
a probability transducer comprising parameters that have been separately derived from raw output from the classifier combined with desired output to provide probabilities for each category.

25. The system of claim 24, wherein each of the elements comprise software modules stored on a machine readable medium.

26. A computer readable medium having data structures stored thereon comprising:
a set of classifier parameters defined to provide raw output representative of category membership for selected inputs; and
a set of probability transducer parameters derived from the raw output provided by use of the classifier parameters, wherein the probability transducer parameters are derived separately from the classifier parameters.

27. A computer readable medium having data structures stored thereon comprising:
a set of classifier parameters defined by a training classifier employing back-propagation using error margins and weight decay to provide raw output representative of category membership for selected inputs; and
a set of probability transducer parameters derived from the raw output provided by use of the classifier parameters, wherein the probability transducer parameters are derived separately from the classifier parameters by minimizing mismatch between probabilities of category membership and desired membership as defined by a test set.

* * * * *

UNITED STATES PATENT AND TRADEMARK OFFICE
CERTIFICATE OF CORRECTION

PATENT NO. : 6,728,690 B1
DATED : April 27, 2004
INVENTOR(S) : Meek et al.

It is certified that error appears in the above-identified patent and that said Letters Patent is hereby corrected as shown below:

Title page,
Item [56], References Cited, U.S. PATENT DOCUMENTS, please add the following:
-- 4,535,221    8/1985      Holsworth
4,547,655    10/1985     Kurata et al.
4,640,340    2/1987      Noda et al.
5,072,093    12/1991     Scheuerer
5,294,775    3/1994      Carrier
5,605,643    2/1997      Reece
5,847,360    12/1998     Lorenzen et al.
6,093,908    7/2000      Haag
6,172,342    1/2001      Khafagy et al.
6,414,270    7/2002      Sugiyama et al.
6,093,910    7/2000      McClintock et al.
6,392,195    5/2002      Zhao et al.
6,495,799    12/2002     Pillsbury, IV et al. --.
FOREIGN PATENT DOCUMENTS, please add:
-- DE 196 11 231 C1  7/1997 --.

Column 2,
Line 53, "$W_{ik}$" should be changed to -- $w_{ik}$ --
Lines 53 and 55, "$\Phi_k$" should be changed to -- $\varphi_k$ --

Column 5,
Line 46, "$X_j$" should be changed to -- $x_j$ --
Line 47, "$y^{(n)}$" should be changed to -- $y^{(n)}$ --
Line 67, "$\Phi$" should be changed to -- $\varphi$ --

Column 6,
Line 21, "$\Phi$" should be changed to -- $\varphi$ --

Column 10,
Line 39, "$f^{(n)}$" should be changed to -- $T^{(n)}$ --

UNITED STATES PATENT AND TRADEMARK OFFICE
CERTIFICATE OF CORRECTION

PATENT NO. : 6,728,690 B1
DATED : April 27, 2004
INVENTOR(S) : Meek et al.

It is certified that error appears in the above-identified patent and that said Letters Patent is hereby corrected as shown below:

Column 10 (cont'd),
Line 47, "$M. = -1$" should be changed to -- $M\_ = -1$ --

Signed and Sealed this

Third Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,728,690 B1
DATED : April 27, 2004
INVENTOR(S) : Meek et al.

It is certified that error appears in the above-identified patent and that said Letters Patent is hereby corrected as shown below:

Title page,
Item [56], References Cited, U.S. PATENT DOCUMENTS, (as inserted by Certificate of Correction issued August 3, 2004) should be deleted:
"4,535,221   8/1985     Holsworth
4,547,655    10/1985    Kurata et al.
4,640,340    2/1987     Noda et al.
5,072,093    12/1991    Scheuerer
5,294,775    3/1994     Carrier
5,605,643    2/1997     Reece
5,847,360    12/1998    Lorenzen et al.
6,093,908    7/2000     Haag
6,172,342    1/2001     Khafagy et al.
6,414,270    7/2002     Sugiyama et al.
6,093,910    7/2000     McClintock et al.
6,392,195    5/2002     Zhao et al.
6,495,799    12/2002    Pillsbury, IV et al.".
FOREIGN PATENT DOCUMENTS, (as inserted by Certificate of Correction issued August 3, 2004) should be deleted:
"DE 196 11 231 C1  7/1997".

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,728,690 B1
DATED : April 27, 2004
INVENTOR(S) : Meek et al.

It is certified that error appears in the above-identified patent and that said Letters Patent is hereby corrected as shown below:

Column 10,
Line 63, "$\Phi$" should be changed to -- $\varphi$ --

Column 11,

Line 33, "$B_i \leftarrow (1-\alpha)B_i - ah_i^{(n)}$" should be changed to -- $B_i \leftarrow (1-\alpha)B_i - \alpha h_i^{(n)}$ --

Line 50, "$Q_k \leftarrow (1-\alpha)Q_k - a\delta_k^{(n)}$" should be changed to -- $Q_k \leftarrow (1-\alpha)Q_k - \alpha\delta_k^{(n)}$ --

Line 60, "$\Phi_j^{(n)}$" should be changed to -- $\varphi_j^{(n)}$ --

Line 61, "$\Phi$" should be changed to -- $\varphi$ --

Column 12,
Line 56, equation should appear as follows: $r_i^{(n)} = t_i^{(n)}$

Column 13,

Line 12, "$i_i^{(n)} = 0$" should be changed to -- $t_i^{(n)} = 0$ --

Signed and Sealed this

Twenty-second Day of March, 2005

JON W. DUDAS
*Director of the United States Patent and Trademark Office*